United States Patent
Kirby et al.

(10) Patent No.: US 8,016,638 B1
(45) Date of Patent: Sep. 13, 2011

(54) MOUTH GAME CALL

(76) Inventors: R. Christian Kirby, Springville, NY (US); Richard C. Kirby, Orchard Park, NY (US)

(*) Notice: Subject to any disclaimer, the term of this patent is extended or adjusted under 35 U.S.C. 154(b) by 273 days.

(21) Appl. No.: 12/214,798

(22) Filed: Jun. 20, 2008

Related U.S. Application Data

(60) Provisional application No. 60/936,547, filed on Jun. 20, 2007.

(51) Int. Cl.
*A63H 5/00* (2006.01)
(52) U.S. Cl. .......... 446/207; 446/202; 446/208
(58) Field of Classification Search .......... 446/202, 446/207, 208, 216
See application file for complete search history.

(56) References Cited

U.S. PATENT DOCUMENTS

| | | | |
|---|---|---|---|
| 2,504,264 A | 4/1950 | Jackson | |
| 3,738,056 A * | 6/1973 | Schultz | 446/202 |
| 4,218,845 A | 8/1980 | Evans et al. | |
| 4,341,037 A * | 7/1982 | Moss | 446/204 |
| 4,483,097 A * | 11/1984 | Piper | 446/207 |
| 4,614,503 A | 9/1986 | Skoda | |
| 4,897,067 A * | 1/1990 | Piper | 446/207 |
| 4,927,399 A * | 5/1990 | Mueller | 446/207 |
| 4,960,400 A | 10/1990 | Cooper | |
| 5,061,220 A | 10/1991 | Cooper | |
| 5,206,070 A | 4/1993 | Haibach et al. | |
| 5,234,369 A * | 8/1993 | Forbes et al. | 446/207 |
| 5,415,578 A | 5/1995 | Jacobsen | |
| 5,520,567 A | 5/1996 | Jacobsen | |
| 5,692,523 A * | 12/1997 | Croll et al. | 128/859 |
| 5,785,574 A * | 7/1998 | Sears | 446/208 |
| 5,895,218 A * | 4/1999 | Quinn et al. | 433/80 |
| 6,612,894 B2 * | 9/2003 | Carlton | 446/202 |
| 6,953,378 B1 | 10/2005 | Finley, Jr. | |
| 2003/0033970 A1 | 2/2003 | Hills et al. | |

OTHER PUBLICATIONS

Quaker Boy, Inc., "Turkey: Mouth Diaphragms," Web catalog at www.quakerboygamecalls.com, Sep. 11, 2008, pp. 1-3 (6 sheets) and "more detail" pages for BF-2, BF-3, and BF-4 calls.
Primos, Inc., "Primos Hunting Calls—A-Frame Series," Web page at www.shop.primos.com, Jun. 19, 2008, p. 1 and detail page for A-Frame Double—Turkey call.
Primos, Inc., "A-Frame Double Turkey Mouth Call," product packaging, 2008.
E.N.Murray Company, Inc., "L-200," Tech Sheet, 2007.
Sekisui Voltek, LLC, "Type TS," Volara Technical Data sheets, 2006, 2 sheets.

* cited by examiner

*Primary Examiner* — Gene Kim
*Assistant Examiner* — Joseph B Baldori
(74) *Attorney, Agent, or Firm* — James C. Simmons

(57) ABSTRACT

A mouth-operated game call comprising at least one sound-making diaphragm, a frame in which an edge portion of the diaphragm is received, and a housing in which the frame is received, wherein the housing is composed at least partially of a cushion or foam material in order to provide improved sealing against the roof of the mouth or denture plate and to relieve discomfort on the tongue by a tab of the call. A member is positioned between the frame and the housing and is shaped to effect a curvature of an outer surface of the housing for sealingly conforming to a contour of a user's palate or upper denture plate. The frame is folded to comprise a pair of upper and lower frame portions between which the diaphragm is received and wherein a tab on the lower frame portion is folded over onto the upper frame portion so that the tab is not in a position to irritate the user's tongue.

10 Claims, 2 Drawing Sheets

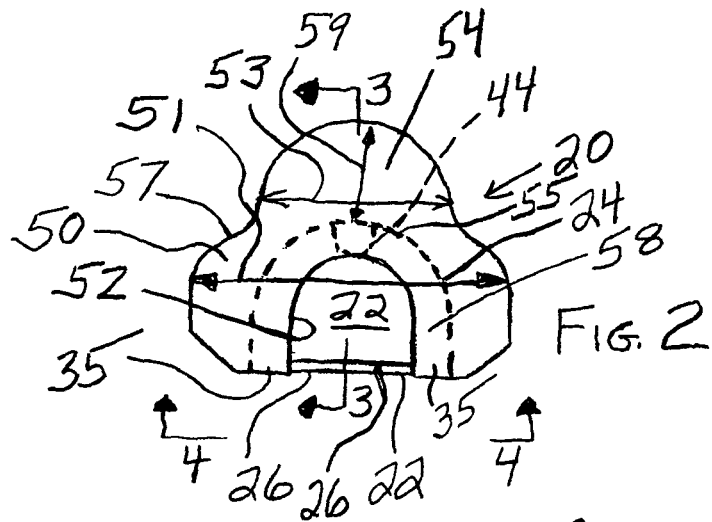
FIG. 2
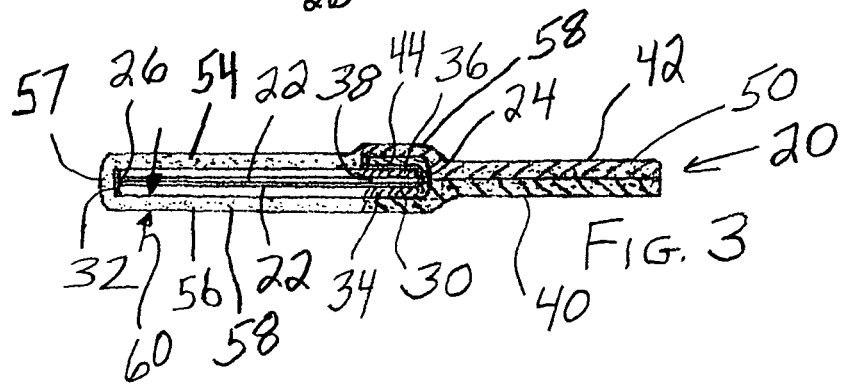
FIG. 3
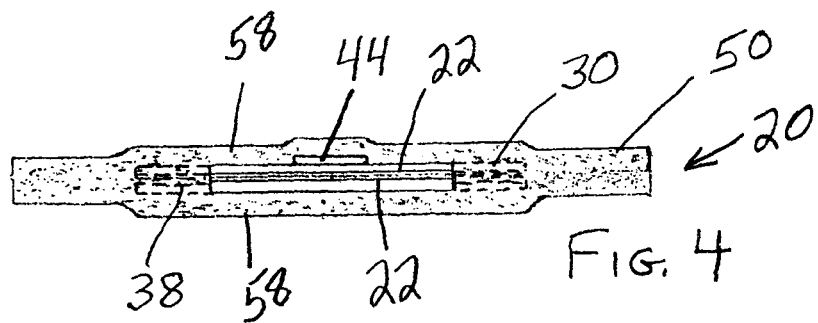
FIG. 4
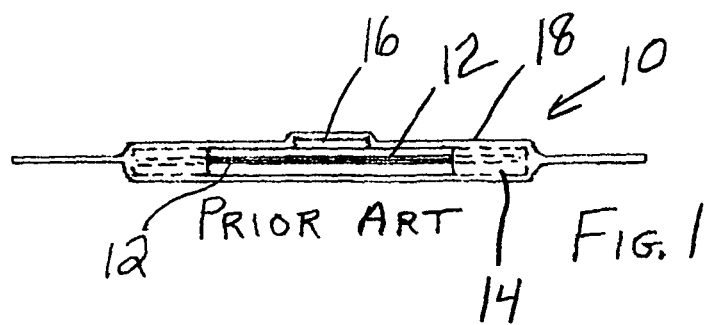
PRIOR ART    FIG. 1

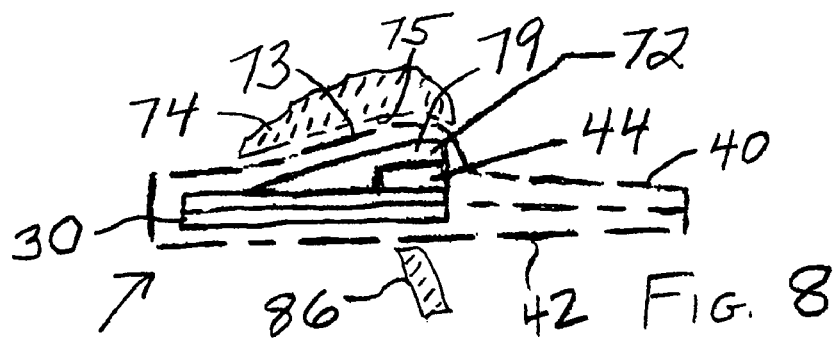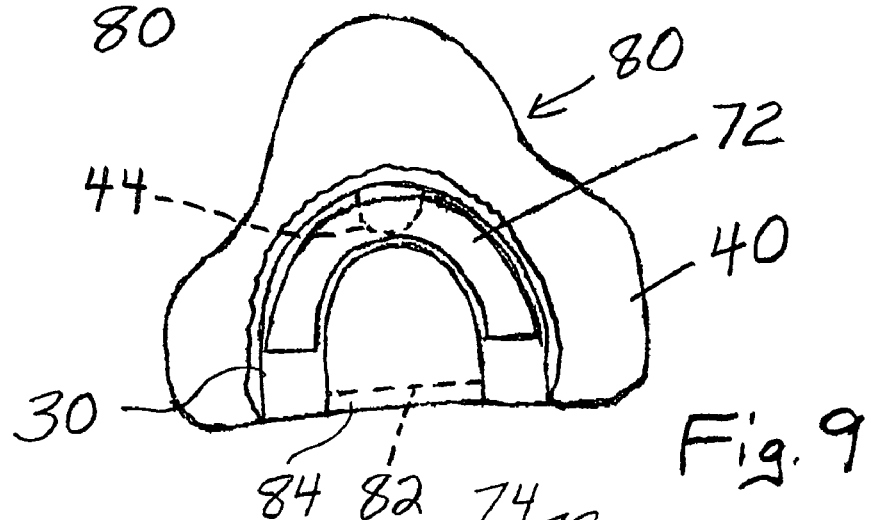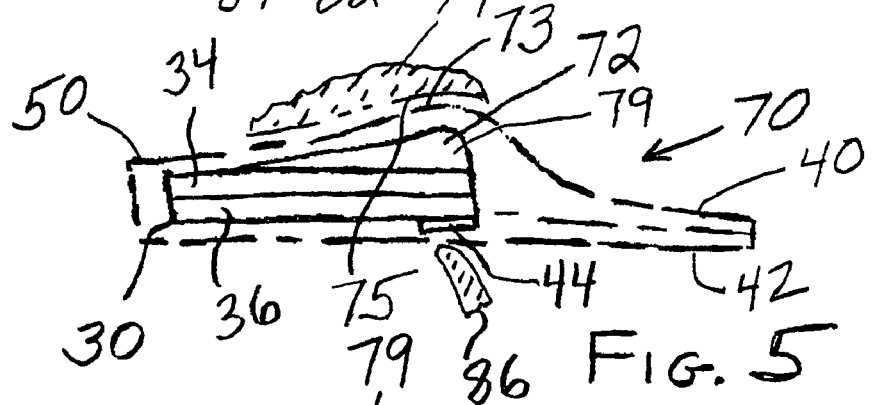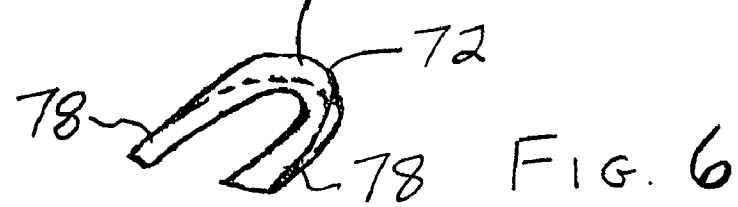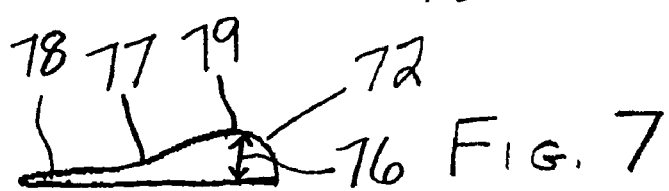

MOUTH GAME CALL

This application claims priority of U.S. provisional patent application 60/936,547, filed Jun. 20, 2007, the disclosure of which is hereby incorporated herein by reference.

The present invention relates generally to game calls. More particularly, the present invention relates to mouth calls, which the hunter inserts into his or her mouth to make wild game sounds.

Examples of mouth calls or the like are found in U.S. Pat. Nos. 2,504,264; 4,218,845; 4,614,503; 4,960,400; 5,061,220; 5,415,578; 5,520,567; and 6,953,378; and U.S. published application 2003/0033970, the disclosures of all of which are hereby incorporated herein by reference. A mouth call (having two or more reeds) known as the A-Frame call is marketed by Primos, Inc. Of Jackson, Miss. (having a web site address of www.primos.com) wherein it is said to be contoured to fit the mouth and wherein it is said that it uses a patent pending process to trap the reeds and keep the perfect amount of tension.

Quaker Boy, Inc. of Orchard Park, N.Y. (whose web site is quakerboygamecalls.com), the company with which Applicants are associated, markets several mouth calls, including its Old Boss Hen call, its Screamin' Green Old Boss Hen call, its Screamin' Green Gobblin' Fever 4-pack including its Jagged Edge, Old Boss Hen, World Champ, and Pro Triple calls, and its Better Fit series (BF-2, BF-3, BF-4) call (which has a tape or housing cut, which is the housing shape illustrated in FIG. 2 and discussed hereinafter with reference to FIG. 2, designed for aiding in air-sealing the call to the palate for better control and improved performance and for providing a more natural fit).

FIG. 1 of the drawings in a front view which illustrates generally at 10 one of the prior art Quaker Boy mouth calls, and it has a plan view similar to the plan view of FIG. 2 or may have the more conventional semi-oval shape housing. The call 10 has a pair (or one or more) of generally planar semi-oval sound-making latex diaphragms or reeds 12, the front edges of which are free to vibrate and the remainder of the perimetric edges or edge portions being suitably encased between upper and lower portions of a U-shaped or horseshoe shaped frame 14 composed usually of aluminum. A tab 16 of one of the frame portions is bent over onto the other frame portion to secure the reeds 12 within the frame 14. Molded plastic frames have also been provided which do not have tabs, the frame halves being instead snap-fitted together. The frame 14 is encased within a housing 18 made of a generally inelastic cloth or tape (self-adhesive, utilizing release paper), the two materials which have typically been used being a waterproof medical tape previously marketed by Johnson & Johnson and a high strength vinyl impregnated cloth tape known as Bookbinder or Gaffer's tape. Gaffer's tape is described in U.S. Pat. No. 5,206,070 as a slight modification of traditional duct tape. The housing 18 has the perimeter shape similar to that shown in FIG. 2 and discussed above for the Better Fit series calls. Other, earlier, calls have had a more semi-oval housing shape.

The above U.S. Pat. No. 6,953,378 discloses a mouth call housing which is composed of elastomeric material. Flexible materials therefor are described as including those selected from the group of polymeric compounds such as silicon silastic E (made by Dow Corning), Saniprene, silicon based compounds, latex based compounds, or any other moldable or resilient materials, and combinations thereof. In one aspect, a crescent flap is said to be adapted to "relatively snugly contact the user's palate and prevent the passage of air between the palate and any reed," and the housing, especially the flap, is said to have the ability to "temporarily conform with the contour of the user's palate."

The above U.S. Pat. No. 5,061,220, which is a continuation-in-part of the above U.S. Pat. No. 4,960,400, refers to a mouth game call embodiment shown in FIGS. 14 and 14A thereof and discloses that a single frame member is employed, the legs being wedge-shaped, tapering convergently from a cross piece to their free ends, and states that the call of this embodiment is particularly helpful to persons the roof of whose mouths slope downwardly forwardly.

The above U.S. Pat. Nos. 5,415,578 and 5,520,567 disclose a diaphragm game call which includes an upwardly extending shelf which extends over a substantial portion of the latex membrane, the shelf providing a constant distance above the latex membrane to render the call easier to use and prevent the caller from damaging the latex membrane from upward pressure by the tongue.

In order to use a mouth call, the user seals the air by pressing his tongue up against the call to force the call against the back of his palate. Although the Quaker Boy mouth calls have worked well over the years, sealing difficulties may arise for any of the above-discussed mouth calls due to no two users having palates that are exactly the same (some are more narrow and high-arched, others are more flat, and others are inbetween). For users wearing dentures, there is difficulty in sealing due to the denture plate extending along the palate being hard and rigid, thus not having any or much give to accommodate sealing. Moreover, if the user has a bump or the like in the roof of his or her mouth, the user has to push harder with his or her tongue to create the seal.

The currently used cloth materials as well as the elastomeric material as in the above U.S. Pat. No. 6,953,378 do not offer satisfactory solutions to the above problems. Of course, the ability of users to slightly bend the frame to better conform the housing to their palates also does not offer a satisfactory solution to the problem.

Moreover, for those mouth calls having tabs, the feel of the tab through the cloth or elastomeric material may be bothersome to the user's tongue, much like in the fabled Hans Christian Andersen story of "The Princess and the Pea."

It is accordingly an object of the present invention to make the sealing of a mouth call against the palate, as well as against a denture plate extending along the palate, easier and softer.

It is another object of the present invention to reduce (ideally eliminate) the bothersome feeling of the frame tab by a user's tongue (Of course a "real prince or princess" may feel the tab no matter what is done).

In order to make the sealing against the palate (or denture plate) easier and softer as well as to prevent or reduce the bothersome feeling of the frame tab (for those calls which have one) by a user's tongue, in accordance with the present invention, the housing is composed at least partially of a foam material or other suitable cushion or padding material.

In order to conform the housing to the curvature of the user's palate or upper denture plate for improving sealing of the call thereto, in accordance with the present invention, a member is positioned between the frame and the housing and shaped to effect a curvature of an outer surface of the housing for sealingly conforming to the contour of the user's palate or upper denture plate.

The above and other objects, features, and advantages of the present invention will be apparent in the following detailed description of the preferred embodiment(s) thereof when read in conjunction with the accompanying drawings wherein the same reference numerals denote the same or similar parts throughout the several views.

BRIEF DESCRIPTION OF THE DRAWINGS

FIG. 1 is a front edge view of a mouth call in accordance with the prior art.

FIG. 2 is a plan view of a mouth call which embodies the present invention, with an upper portion of a housing covering a frame removed for purposes of clarity of illustration.

FIG. 3 is a sectional view of the call of FIG. 2 taken along lines 3-3 thereof.

FIG. 4 is a view, similar to that of FIG. 1, of the call of FIG. 2 taken along lines 4-4 thereof.

FIG. 5 is a side view, with the housing shown with phantom lines, of an alternative embodiment of the mouth call.

FIG. 6 is a perspective view of an insert for the alternative mouth call.

FIG. 7 is a side view of the insert.

FIG. 8 is a view similar to that of FIG. 5 of another embodiment of the mouth call.

FIG. 9 is an upper plan view, with an upper portion of the housing covering the frame removed for purposes of clarity of illustration, of the mouth call of FIG. 8.

DETAILED DESCRIPTION OF THE PREFERRED EMBODIMENT(S)

Referring to FIGS. 2 to 4, there is illustrated generally at 20 a mouth game call which is shown to have two thin generally planar diaphragms 22 composed of latex or other suitable material and capable of vibrating to produce sound (wild game sounds) as air is forced thereover by the user, as is well known to those of ordinary skill in the art to which the present invention pertains. One (the lower) of the diaphragms 22 is seen to stick out beyond the other by a slight amount such as, for example, 1/16 inch. The diaphragms 22 may alternatively be reeds or diaphragm reeds, and reeds and diaphragms are conventional and commonly known to those of ordinary skill in the art to which the present invention pertains, and the terms "diaphragm" and "reed" may be used interchangeably herein and in the claims, unless otherwise specified. It should be understood that a call in accordance with the present invention may have only one or any other number of diaphragms. The diaphragms 22 are generally semi-oval shaped, each having a generally semi-oval edge, illustrated to be at 24 (but not seen in FIG. 2), extending around from one to the other of the ends of a straight (or slightly curved) front edge 26. It should be understood that the diaphragms 22 may be otherwise suitably shaped.

The diaphragms 22 are held or secured by a frame 30 composed of aluminum, molded plastic, or other suitable material. The description hereinafter will be with respect to an aluminum or otherwise metallic frame having a tab 44 (discussed more specifically hereinafter, although such metallic frames would not necessarily have tabs), it being understood that the two halves of such a molded plastic frame may be snap-fitted together rather than have a tab. It should be understood that all such frames, with or without tabs, are meant to come within the scope of the present invention.

The frame 30 is formed as an oval member having an oval cut-out and which is bent in half at 32 so that the two halves 34 and 36 overlie each other, thereby forming a generally U-shape or horseshoe shape, which corresponds to the generally semi-oval shape of the diaphragms 22, and having a generally U-shaped or semi-oval shaped cut-out, illustrated at 52. A generally U-shaped or horseshoe-shaped edge portion 38 of each of the diaphragms 22 is received between the respective legs 35 of the frame halves 34 and 36, these diaphragm edge portions 38 as well as the frame legs 35 each having a width of, for example, about 1/4 inch. It should of course be understood that the frame as well as the diaphragms may be otherwise suitably shaped. Thus, the diaphragm edge portions 38 are secured between the frame legs 35 while their front edges 26 are left free to vibrate and make the desired sounds.

Illustrated at 40 and 42 are the upper and lower sides respectively of the call 10 when it is properly placed in a person's mouth to make sounds. The upper frame half 34 has the tab 44 at its terminal end. As seen in FIG. 3, the upper frame half 34 is bent so that this tab 44 overlies the lower frame half 36 and is pressed against the lower frame half 36 to hold the frame halves together and pinch or secure the diaphragms 22 between the frame halves.

The frame 30 is received and secured within a housing 50 composed of a piece of material (more specifically described hereinafter). The piece of material 50 is formed with a central cut-out, illustrated at 52, sized to the frame cut-out, and is formed to extend outwardly beyond the frame 30 so that the call 20 may be suitably received within the user's mouth. The outer perimeter may be shaped as seen in FIG. 2, as previously discussed, may be semi-oval in shape, or may otherwise be suitably shaped. Similarly as for the frame, the material 50 is folded, as illustrated at 57, so that the opposite identical halves 54 and 56 overlie each other and receive the frame 30 therebetween, the cut-out 52 leaving the diaphragms 22 free to vibrate. The material halves 54 and 56 are adhesively or otherwise suitably attached to each other as well as desirably to the frame 30. The portions of the material 50 overlying the frame 30 are illustrated at 58.

A preferred shape, discussed earlier with respect to current Quaker Boy mouth calls, of the housing 50 is as shown in FIG. 2 wherein the housing extends laterally outwardly of the frame 30 thereby providing an increased housing width, illustrated at 51, then at or about the rear, illustrated at 55, of the frame 30 tapering inwardly, as illustrated at 57, in what might be called a shamrock fashion, to define a reduced housing width, illustrated at 53, over the distance, illustrated at 59, which the housing 50 extends rearwardly of the frame 30. The material of the housing 50 (described hereinafter) is provided in combination with such a shape to provide an even greater overall sealing effect than either alone.

In order for a mouth call to work effectively, the user must use his or her tongue to press the housing up against the roof of his or her mouth (or against a denture plate extending along the palate), and the housing must as a result be adequately sealed against the roof of the mouth (or the denture plate). The conventional cloth/tape materials (as well as an elastomeric material as in the above U.S. Pat. No. 6,953,378) used for mouth call housings do not provide as adequate sealing as desired for the variety of palate curvatures from high-arched to flat and including bumps as well as for the hard and rigid denture plates. In addition, for those calls having tabs, the tab is uncomfortable on the user's tongue. In order to provide a softer material which provides improved sealing of the call housing against the roof of the mouth (or denture plate) as well as to reduce (ideally eliminate) the discomfort of the tab on the user's tongue, in accordance with the present invention, the housing 50 is composed of a cushion or padding material. As used herein and in the claims, a "cushion" or "padding" material is defined as a material which is substantially compressible under the typical pressures applied by a person's tongue to conformingly seal the material, in a mouth call housing, against the roof (palate) of his or her mouth. For example, a material which requires a pressure of only 4 psi (pounds per square inch) or less to achieve a 25% deflection and/or which requires a pressure of only 11 psi or less to achieve a 50% deflection is considered to have substantial compressibility, unlike typical substantially incompressible cloth/tape/elastomer materials at such forces. Thus, the cushion or padding material is provided to allow it to sealingly contour to the shape of and around bumps and the like in the roof (palate) of the user's mouth (or to a hard rigid denture plate) when typical force is applied by his or her tongue and to decrease (or ideally eliminate) discomfort by a mouth call tab to his or her tongue.

In accordance with a preferred embodiment of the present invention, the material of which the housing 50 is composed is a foam material. As used herein and in the claims, a "foam" material is defined as a non-rigid mass having voids or empty spaces therein which are typically formed by the dispersal of gas bubbles therein during its formation. The foam material desirably is closed cell so that it can desirably repel water.

Preferably, the material of which the housing 50 is composed is polyethylene foam material. A polyethylene foam material which Applicant has found to be desirable is 5T5 White W/2237 PSA crosslinked polyethylene foam material sold by E.N.Murray Company, Inc. of Denver, Colo. (having a web site address of enmurray.com). Another suitable polyethylene foam material which Applicant has found to be suitable is the L-200 Minicell crosslinked polyethylene foam material (which is a closed cell material formed as an adhesive tape utilizing release paper, using principles commonly known to those of ordinary skill in the art to which the present invention pertains) also sold by E.N.Murray Company, Inc. Applicant understands that such a material has a compression strength (ASTM D35875-84) of 4 to 8 psi at 25% deflection and 11 to 18 psi at 50% deflection and has a 21% compression set (percent of original thickness) (ASTM D35875-84). A flexible polyurethane foam material sold by the same company is considered to also be suitable, when prepared at a suitable thickness similar to the thickness of the polyethylene material or as may otherwise be suitable.

The housing material on conventional mouth calls has a thickness typically of around 0.01 inch, and the non-cushion quality thereof is not considered to provide the desirable characteristics of the present invention at greater thicknesses. It has been determined that a thickness of the aforesaid polyethylene foam material of over about 0.06 inch was too thick for effective operation of the call, while the material may begin losing durability at thicknesses less than about 0.02 inch. In addition, it becomes more difficult to achieve the desired cushion effect as the thickness is reduced below about 0.02 inch. Accordingly, the thickness, illustrated at 60, of the housing material is preferably between about 0.02 and 0.06 inch, more preferably about 0.04 inch.

The housing 50 may be formed by applying double-sided tape, such as the tape described above used in Quaker Boy mouth calls or other suitable tape, to one side of the foam material, then adhering the tape to itself as the housing material is caused to overlie itself to encase the frame, or the housing may be otherwise suitably formed.

Referring to FIGS. 5 to 7, there is shown generally at 70 a mouth call in accordance with an alternative embodiment of the present invention, wherein the diaphragm or diaphragms 22 are not shown for purposes of clarity, it being understood that they are contained within the call 70 similarly as illustrated for FIGS. 1 to 4. In accordance with this embodiment, a member or insert 72 is suitably inserted or positioned and/or attached (for example, adhered to the frame 30, or held in place by the housing 50) between the frame 30 and the housing 50 to provide a bulge or dome-shaped or crescent-shaped form for providing a desired call shape for sealingly conforming the shape of the housing 50 to the shape of the palate, illustrated at 74, (or upper denture plate), as illustrated in FIG. 5. Thus, the insert 72 is provided to effect a conforming curvature, illustrated at 73, of the housing 50 so that the housing 50 better conforms to the curvature, illustrated at 75, of the palate 74 or upper denture plate for improved sealing and comfort and effectiveness, making the call even more effective for sealing to the wide variety of palate shapes as well as rigid denture plates.

As illustrated in FIGS. 6 and 7, the insert 72 has a generally horseshoe shape and having a width generally equal to the width of the frame 30 and otherwise suitably sized and shaped to conform to and rest on the upper surface of the horseshoe-shaped upper frame half 34 and tapers (or otherwise suitably increases) along each of its legs 78 to a maximum thickness, illustrated at 76, at or about the junction or apex portion 79 at the call rear centrally between the legs 78. For example, the thickness is shown to remain relatively thin along the legs 78, then at about point 77 (intermediate or approximately midway of its leg length), increase substantially in thickness to form the desired bulge or dome-shape at 79 over generally the insert width for providing the curvature for conforming to the curvature of the palate 74 or denture plate. The thickness 76 may, for example, be about 0.04 to 0.08 inch, such as, for example, about 0.06 inch. It should of course be understood that the insert 72 may be otherwise suitably shaped and sized. The insert 72, lying to the top of the frame 30, is shown in FIG. 5 to be positioned generally opposite the tab 44 (or where the tab would be if the call had one), which lies to the bottom of the frame 30, or the insert 72 is otherwise suitably positioned.

The insert 72 need not be cushion material, but it could be cushion material or a rigid material such as, for example, plastic or aluminum, having a dome or crescent shape or other suitable shape for providing a suitable bulge having a shape desirably conforming to the shape of the palate 74 or denture plate.

The conventional mouth multi-reed call has the shorter reed to the bottom with the tab lying to the bottom wherein, as previously discussed, it is bothersome and uncomfortable on the tongue. Referring to FIGS. 8 and 9, there is shown generally at 80 a mouth call in accordance with another embodiment of the present invention, the reeds not shown in FIG. 8 for purposes of clarity of illustration. As seen in FIG. 9, the reeds (or diaphragms) of call 80 are inserted in the frame 30 with the shorter reed 82 to the bottom and the longer reed 84 to the top (as in the above-described conventional call, if the call is of the multi-reed type). In order to eliminate the discomfort on the tongue, illustrated at 86, by the tab 44, in accordance with the present invention, the tab 44 is folded over to lie on the top of the frame 30 (as the frame is inserted into the mouth). The insert 72 is positioned over the tab 44 to provide the desired bulge 79 (and its thickness 76 may be suitably reduced as necessary taking into account the added thickness of the tab 44), the cushion material of the housing 50 provided to eliminate or alleviate the otherwise discomfort of the tab 44 and/or insert 72 against the roof 74 of the mouth. If desired, the insert 72 may also be made of foam or otherwise cushion material (similar to or the same as that of which the housing 50 is made) to further remove any discomfort of the tab 44 (as well as the insert 72) on the roof 74 of the mouth.

Thus, the mouth call as disclosed herein is provided to be more comfortable, more effective, and provide better sealing to the palate (or denture plate).

It should be understood that, while the present invention has been described in detail herein, the invention can be embodied otherwise without departing from the principles thereof, and such other embodiments are meant to come within the scope of the present invention as defined by the appended claims.

What is claimed is:

1. A mouth-operated game call comprising at least one sound-making diaphragm, a frame in which an edge portion of said diaphragm is received, and a housing in which said frame is received, wherein said housing is composed at least partially of a foam material, the game call further comprising means for effecting a curvature of a surface of said housing in a manner for sealingly conforming said housing to a contour of a user's palate or upper denture plate said curvature effecting means comprising a generally u shaped member conforming to a shape of said frame positioned between said frame and said housing in a manner conforming to the footprint of said frame.

2. A game call according to claim 1 wherein said member is composed at least partially of a cushion material.

3. A game call according to claim 1 wherein said member has a pair of leg portions joined by an apex portion and sized to be received on said frame, said apex portion shaped to define a bulge for effecting said curvature of said housing outer surface.

4. A game call according to claim 1 wherein said frame is folded to comprise a pair of upper and lower frame portions between which said diaphragm is received and wherein a tab on said lower frame portion is folded over onto said upper frame portion.

5. A game call according to claim 4 wherein said at least one diaphragm comprises at least two of said diaphragm one of which is longer than an other of said at least two diaphragms, said longer diaphragm disposed to lie above said other diaphragm.

6. A game call according to claim 4 wherein said member has a pair of leg portions joined by an apex portion and sized to be received on said frame, said apex portion shaped to define a bulge for effecting said curvature of said housing outer surface, and wherein said tab is disposed between said apex portion and said upper frame portion.

7. A mouth-operated game call comprising at least one sound-making diaphragm, a frame which is folded to comprise a pair of upper and lower frame portions between which an edge portion of said diaphragm is received, a tab on said lower frame portion, said tab being folded over onto said upper frame portion, a housing composed at least partially of a cushion material and in which said frame is received, wherein said cushion material is a foam material, the game call further comprising means for effecting a curvature of a surface of said housing in a manner for sealingly conforming said housing to a contour of a user's, palate or upper denture plate, said curvature effecting means comprising a member positioned between said tab and said housing.

8. A game call according to claim 7 wherein said cushion material is a polyethylene foam material.

9. A game call according to claim 7 wherein said member has a pair of leg portions joined by an apex portion and sized to be received on said frame, said apex portion shaped to define a bulge for effecting said curvature of said housing outer surface, and wherein said tab is disposed between said apex portion and said upper frame portion.

10. A game call according to claim 7 wherein said housing is shaped to extend laterally outwardly of said frame then at about a rear of said frame abruptly tapering inwardly in a shamrock fashion and defining a reduced housing width over a distance which said housing extends rearwardly of said frame.

* * * * *